United States Patent [19]
Seely et al.

[11] 3,811,361
[45] May 21, 1974

[54] COLLET FOR A POWER TOOL

[75] Inventors: Robert W. Seely, Easley; William A. Batson, Pickens, both of S.C.

[73] Assignee: The Singer Company, New York, N.Y.

[22] Filed: Nov. 13, 1972

[21] Appl. No.: 306,090

[52] U.S. Cl............. 90/12 D, 144/134 D, 279/52
[51] Int. Cl............... B23b 31/20, B23c 1/20
[58] Field of Search..... 279/1 ME, 51, 52; 90/12 D; 144/134 D, 136 C

[56] References Cited
UNITED STATES PATENTS
| | | | |
|---|---|---|---|
| 3,487,747 | 1/1970 | Burrows et al. | 144/134 D |
| 3,035,845 | 5/1962 | Benjamin | 279/51 X |
| 2,867,251 | 1/1959 | Moretti et al. | 144/134 D |

FOREIGN PATENTS OR APPLICATIONS
587,076 4/1947 Great Britain...................... 279/51

*Primary Examiner*—Francis S. Husar
*Attorney, Agent, or Firm*—Marshall J. Breen; Chester A. Williams, Jr.; Harold Weinstein

[57] ABSTRACT

A collet for a power tool such as a router which has a lockable armature shaft, the lower end of which is externally threaded and internally bored so that it may be fitted with an interconnected nut and split sleeve combination. The split sleeve fits within the internal bore of the shaft whereby on turning of the nut in one direction the sleeve will be compressed to lock the shank of a bit within its central aperture. To remove the bit the nut is turned in the opposite direction to jack the sleeve away from the shaft.

1 Claim, 8 Drawing Figures

PATENTED MAY 21 1974 3,811,361

COLLET FOR A POWER TOOL

BACKGROUND OF THE INVENTION

Heretofore, in the prior art, collets for power tools such as routers, a problem was encountered in that when the collet was tightened to contain a bit the split member or sleeve was clamped onto the armature shaft. This resulted in the split member locking upon the armature shaft so that even after loosening the nut, the bit was very hard to remove unless it was rapped against another object. The result was possible damage to the bit or collet, to say nothing of the frustration and time required in changing bits.

SUMMARY OF THE INVENTION

It is an object of the present invention to provide an improved collet which overcomes the prior art disadvantages; which is simple, economical, and reliable; which has a nut and split sleeve interconnected to form a subassembly engaged upon the lower end of the armature shaft; which has an interconnected nut and split clamping sleeve wherein turning the nut in one direction causes the sleeve to compress within the armature shaft to lock the bit thereto and turning the nut in the opposite direction jacks the sleeve away from said shaft to loosen the bit; which uses a sleeve having a conically tapered section fitting within a correspondingly tapered section of the internally bored armature shaft; which has a lockable armature shaft during tightening or loosening of the collet; and which uses a flange nut to entrap a neck portion of the split clamping sleeve by means of a retaining clip or ring.

Other objects and advantages will be apparent from the following description of one embodiment of the invention and the novel features will be particularly pointed out hereinafter in the claims.

BRIEF DESCRIPTION OF THE DRAWINGS

This invention is illustrated in the accompanying drawings in which.

DESCRIPTION OF THE INVENTION

Figure 1:
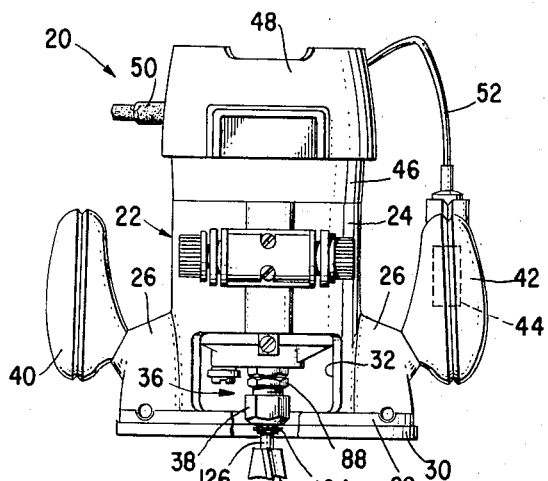
FIG. 1 is a front elevational view of a portable electric router embodying the present invention.
Figure 2:
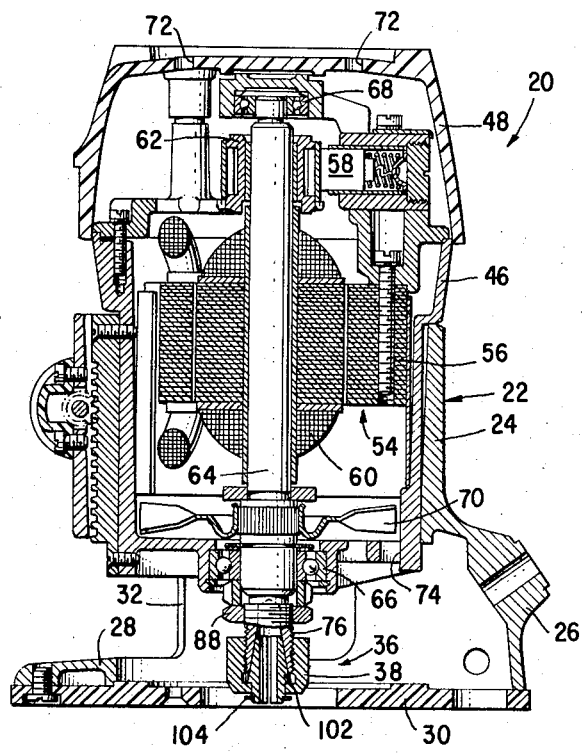
FIG. 2 is an enlarged elevational view, partly in section, of the router showing the novel collet.

A router, designated generally as 20, is illustrated in FIGS. 1 and 2 as having a stationary base 22, the upper portion of which is in the form of a cylindrical sleeve 24. The sleeve 24 has two downwardly extending diametrically opposed leg portions 26 which terminate in a flat flanged portion 28 that is adapted to contact the work itself, or to receive a nonmetallic subbase 30 suitable for sliding over the work. A large aperture 32 is provided between the legs 26 and flange 28 through which to observe the cutting of the work by a suitable tool bit 34 secured in an improved collet 36 by a nut 38, as is more fully set forth hereinafter.

Secured to the base 22 on the outside of one leg 26 is a handle 40, and on the other leg 26 is a control handle 42. A trigger switch 44 shown dotted, is mounted in the control handle 42 to provide for natural two-hand guiding of the router 20 with the trigger switch always under the operator's finger and available for instant control.

A motor housing 46 is adapted to telescope within the base 22 for vertical sliding motion relative thereto. An insulated end cover 48 surmounts the motor housing 46 and is adapted to receive a power cord 50 and a switch cable 52 for electrical connection to the switch 44 housed within the control handle 42.

A series commutator electric motor 54 is connected in series with a power cable 50 and the switch cable 52, and is mounted within the motor housing 46. The motor 54 has a stator core 56, brush and brush holders 58 arranged in conventional fashion. A rotor 60 with a commutator 62 is mounted on an armature shaft 64 journaled in bearings 66 and 68. A fan 70 carried by the shaft 64 provides ventilation for the motor by drawing air in through apertures 72 formed in the end cover 48 and exhausting it through apertures 74 in the lower end of the motor housing 46 where it is instrumental in blowing chips away from the bit 34.

The lower end of the armature shaft 64 has an externally threaded portion 76 through which a vertical slot 78 extends. An annular member 80 having slabbed sides 82 and an internal projection 84 keyed within the slot 78, is axially received upon the portion 76 of the shaft 64. Diametrically opposed recesses 86 are formed between the slabbed sides 82. The member 80 rests against the lower end of the inner race of the bearing 66 and is locked in position by a nut 88 threadedly received on the threaded portion 76.

Figure 3:
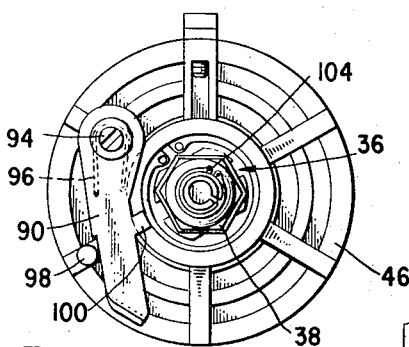
FIG. 3 is a bottom plan view of the motor housing having the improved collet connected to the armature shaft journaled therein.
Figure 5:
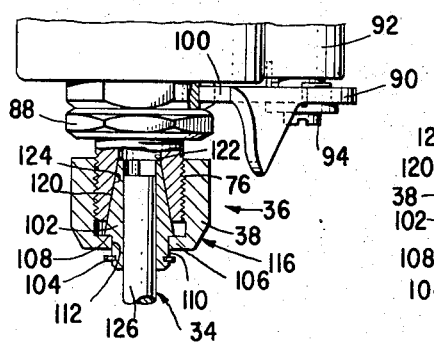
FIG. 5 is a side elevational view, partly in section, of the improved collet and bottom portion of the motor housing wherein the shank of the bit is locked within the collet.

A locking lever 90 illustrated in FIGS. 3 and 5 is pivotably mounted to a boss 92 of the motor housing 46 by a shoulder screw 94 which carries a spring 96 which biases the lever away from the armature shaft 64 to contact a stop pin 98. A finger 100 projects outwardly from the side of the lever opposite the armature shaft. Whenever it is desired to lock the armature shaft and prevent its turning as during the loosening and tightening of the collet, the locking lever may be moved into position against the shaft 64 by placing the finger 100 within the recess 86. The armature shaft is freed by merely releasing the locking lever 90 and permitting the spring 96 to bias it away from the shaft 64.

Figure 4:
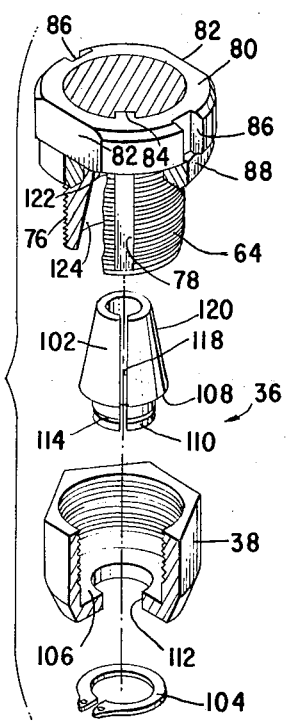
FIG. 4 is an exploded perspective view, partly in section, of the novel collet.

The improved collet 36 includes the nut 38, a split clamping sleeve 102 and a retainer clip or ring 104. The bottom portion of the nut 38 has an inwardly extending annular flange 106 upon which is seated a shoulder 108 of the sleeve 102. A neck portion 110 extends downwardly from the shoulder 108 and has a diameter sized to pass through the central opening 112 to be surrounded by the flange 106 with the diameter of the central opening 112 slightly larger than the diameter of the neck portion 110, so as to permit relative axial sliding movement therebetween. The neck portion 110 extends below the nut 38 and adjacent the bottom, an annular groove 114 is formed as best seen in FIG. 4. The retainer clip 104 is disposed within the groove 114 to entrap the flange 106 between the shoulder 108 and the clip 104. Thus, the split clamping sleeve 102 and the nut 38 are interconnected to form a subassembly designated generally 116.

A split 118 runs the full axial length of the sleeve 102. A tapered section 120 is formed above the shoulder 108 to slope inwardly and upwardly therefrom. The shaft 64 has an axial aperture 122, the lower end of which is formed in a tapered section 124 which slopes downwardly and outwardly at a slope corresponding to that of the tapered section 120 of the sleeve 102.

Whenever it is desired to change or lock a bit 34 within the collet 36, the shank 126 of the bit 34 is inserted within the internal opening of the sleeve 102. The lock lever 90 will engage the member 80 to prevent the armature shaft 64 from turning and the nut 38 will be turned in one direction to raise the same upon the threaded portion 76 of the shaft 64. The act of turning nut 38 will force the sleeve 102, whose shoulder 108 sits upon the flange 106, upwardly into contact within the tapered section 124 with the corresponding tapered section 120 of the sleeve 102. After the initial contact is made between the corresponding tapered sections 120 and 124, continued turning of the nut 36 acts to compress the split 118 of the split clamping sleeve 102, whereby the shank 126 will be firmly locked within the collet 36, as is illustrated in FIG. 5.

One of the principal features of the present invention is to provide an axial clearance between the shoulder 108 and the clip 104 of the neck portion 110 of the sleeve 102. The flange 106 is axially slidable between the shoulder 108 and the clip 104. The axial distance on the neck portion 110 between the shoulder 108 and the clip 104 is equal to substantially one and one-half times the axial length of the flange 106. This means that the flange 106 as shown in FIG. 5 is out of contact with and spaced from the clip 104.

Figure 6:
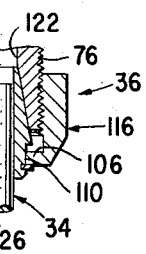
FIG. 6 is an elevational sectional view of the improved collet after the nut has started to be loosened, but before the shank has been released.
Figure 7:
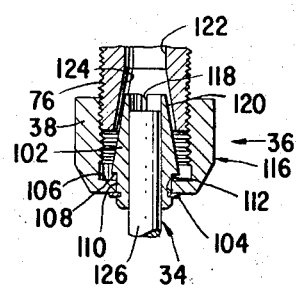
FIG. 7 is an elevational sectional view of the collet with the split sleeve in uncompressed condition.
Figure 8:
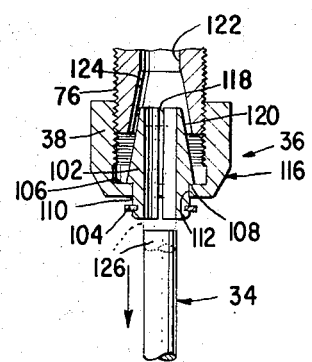
FIG. 8 is an elevational view, partly in section, of the collet in loosened position after the bit has been removed.

Changing or replacing the bit 34 from the collet 36 is shown in FIGS. 6, 7 and 8, wherein FIG. 6 shows the nut 38 having been turned in the other direction to remove the flange 106 from contact with the shoulder 108 and bring it into contact with the top of the retainer clip 104. In this position, the split clamping sleeve 102 is still locked within the internal bore 122 of the shaft 64.

FIG. 7 shows the nut after having been continuously turned to jack the split clamping sleeve away from and out of contact with the tapered section 124 of the armature shaft 64. In this position, the previously compressed split 118 is permitted to expand, thus releasing its clamping hold upon the shank 126 of the bit 34. Thereafter, the shank 126 is easily removed from the sleeve 102 as illustrated in FIG. 8 by even the slightest downward force, thus removing the bit 34 from the collet 36.

The improved collet 36 of the present invention provides a nut 38 having a flange 106 which is connected to the neck portion 110 of the sleeve 102 with a positive axial clearance between the shoulder 108 and the clip 104 to permit the flange 106 free axial movement therebetween in the manner prescribed hereinbefore with respect to the description of connection and removal of the bit 34 under FIGS. 5, 6, 7 and 8.

The neck portion 110 has a diameter substantially equal to or slightly smaller than the diameter of the central opening 112 of the flange 106 of the nut 38. The annular groove 114 on the neck portion 110 is sized to receive only the clip 104.

Thus, the flange 106 is free to move axially along the neck portion 110 between the shoulder 108 of the sleeve 102 at the upper end of the neck portion 110 and the retaining clip 104 at the lower end of the neck portion 110 upon being threadedly rotated in one or the other direction. The axial clearance permits easier tightening and loosening of the nut 38 in that the nut 38 rotation is free of sleeve 102 interference or binding in the axial direction when the operator initially starts to turn the nut 38. The axial clearance not only is beneficial during assembly of the collet 36 depicted in FIG. 5, so as to eliminate all problems of manufacturing tolerances, but also after tool use upon removal of the bit 34, depicted in FIGS. 6, 7 and 8, so as to permit the operator added leverage in initially rotating the nut 38 "free" of the sleeve 102. In this way, the improved collet 36 of the present invention can be tightened and loosened more reliably, with less effort and without the danger of wrench slippage, by providing a certain degree of free swinging motion of the nut 38 made possible by the built-in axial clearance not found in prior art chucks or collets.

While the collet 36 has been shown connected directly to the armature shaft 64, it will be understood that the collet could have been connected to any other shaft which extended from the motor housing 46 and was driven by or through the motor 54. Also, any means for locking the shaft 64 could have been used so long as the shaft 64 is locked during the clamping or loosening operation of the collet 36 when it is desired to change, remove or replace a bit 34.

It will be understood that various changes in the details, materials, arrangements of parts and operating conditions which have been herein described and illustrated in order to explain the nature of the invention may be made by those skilled in the art within the principles and scope of the invention.

Having thus set forth the nature of the invention, what is claimed herein is:

1. In a motor driven router having a housing and a base, the combination of:
   a. an armature shaft journaled in the housing with the free end thereof extending toward the base and adapted to rotate a bit,
   b. a locking means connected to the housing detachably to engage the armature shaft to prevent rotation thereof,
   c. the free end of the armature shaft being externally threaded and internally bored,
   d. the internal bore of the free end frustoconical in shape to flare outwardly to the bottom of the end,
   e. a nut threadedly connected to the external thread of the free end of the armature shaft,
   f. an inwardly extending radial flange formed on the nut,
   g. a split sleeve having a frustoconical section corresponding to the taper of the internal bore, an axially extending neck section having an axial length of substantially twice the axial length of the flange, the neck section having an upper end and a lower end, the neck section having a diameter slightly smaller than the diameter of the radial flange of the nut to permit relative axial sliding movement therebetween, and a shoulder extending radially outwardly from the upper end of the neck section to terminate at the lower end of the conical section, h. an annular groove formed on and inwardly of the lower end of the neck section of the sleeve remote from the shoulder, and at an axial distance from the shoulder of approximately one and one-half times the axial length of the flange,
i. the sleeve received within the nut with the neck section extending axially below the flange and the shoulder seated upon the flange,
j. a retaining clip disposed in the annular groove to define a second annular groove to captively locate the flange between the shoulder and the clip, said second annular groove having an axial extent equal to approximately one and one-half times the axial length of the flange thereby providing an axial clearance for the flange within the second annular groove of approximately one-half the length of said flange,
k. the nut threadedly received on the externally threaded lower end of the armature shaft to place the conical section of the sleeve within the internal bore of the free end of the armature shaft,
l. the nut to be turned in one direction to have the flange engage the shoulder and force the sleeve into the internal bore to compress the split of the sleeve and clamp the same securely therein, and
m. the nut to be turned in the opposite direction to move the flange axially downwardly through an axial distance equal to the axial clearance to engage the clip, and jack the sleeve from the shaft whereby the respective conical sections will separate and the shoulders of the sleeve will come to rest upon the flange with the split in uncompressed position.

* * * * *